United States Patent [19]
Kennedy

[11] 3,857,665
[45] Dec. 31, 1974

[54] POLYSTYRENE EXTRUDER DIE PLATE

[75] Inventor: Frank Kennedy, Pittsburgh, Pa.

[73] Assignee: United States Steel Corporation, Pittsburgh, Pa.

[22] Filed: Apr. 11, 1973

[21] Appl. No.: 350,289

[52] U.S. Cl.................. 425/378, 425/382, 425/464
[51] Int. Cl............................................. B29f 3/04
[58] Field of Search ............ 264/142, 145; 425/376, 425/378, 464, 192, 190, 461, 470, 382, 379, 463, 311, 314, 67, 230

[56] References Cited
UNITED STATES PATENTS 3,230,582 1/1966 Hoffmann et al.............. 425/377 X
3,461,495 8/1969 Swickard et al................ 425/378 X Primary Examiner—R. Spencer Annear
Assistant Examiner—Mark Rosenbaum
Attorney, Agent, or Firm—John E. Callaghan

[57] ABSTRACT

Die plates for thermoplastic resin extruders are provided which have radial and annular ribs to reinforce the plate against deflection and distribute flowing polymer, radially disposed heating channels in the plate, and/or heating channels formed with metal inserts for a portion thereof.

11 Claims, 3 Drawing Figures

POLYSTYRENE EXTRUDER DIE PLATE

BACKGROUND OF THE INVENTION

In the extrusion of thermoplastic resins, high pressures and high temperatures are used in order to cause molten polymer to flow through the extrusion die.

The underwater die face pelletization of thermoplastic resins such as polystyrene and polyethylene requires that the die plate generally be heated just adjacent to the downstream or cold face of the die. It has been difficult to control the temperature of the die plate with such heating and it has been difficult to provide reliable die plates for continuous extrusion and pelletization of the resins. Swickard et al U.S. Pat. No. 3,461,495 illustrates die plates for underwater die-face pelletization of resins and describes the problems of heat distribution in the die plate and the difficulties in providing satisfactory die plates.

OBJECTS OF THE INVENTION

It is among the objects of this invention:

to provide die plates for the extrusion of thermoplastic resin materials having improved structural support means for the orifices in such die plates which means will also promote uniform flow of polymer over the face of the die plate;

in die plates of such character, to improve the temperature distribution across the face of the die plate;

to provide improved constructions for the heat exchange passages in such die plates that allow conventional machining techniques to be used for such passages.

DESCRIPTION OF THE INVENTION AND DRAWINGS

The die plates of this invention are characterized by having reinforcing means to resist deflection of the die plate during operation, heat exchange means disposed in concentric arcuate segments about the center line of the die plate, and the construction of the heat exchange passages in two or more separable parts. With these improvements, the stability and reliability of the die plate during extrusion of molten thermoplastic resins is improved and the control of the temperature of the die plate is improved.

Figure 1:
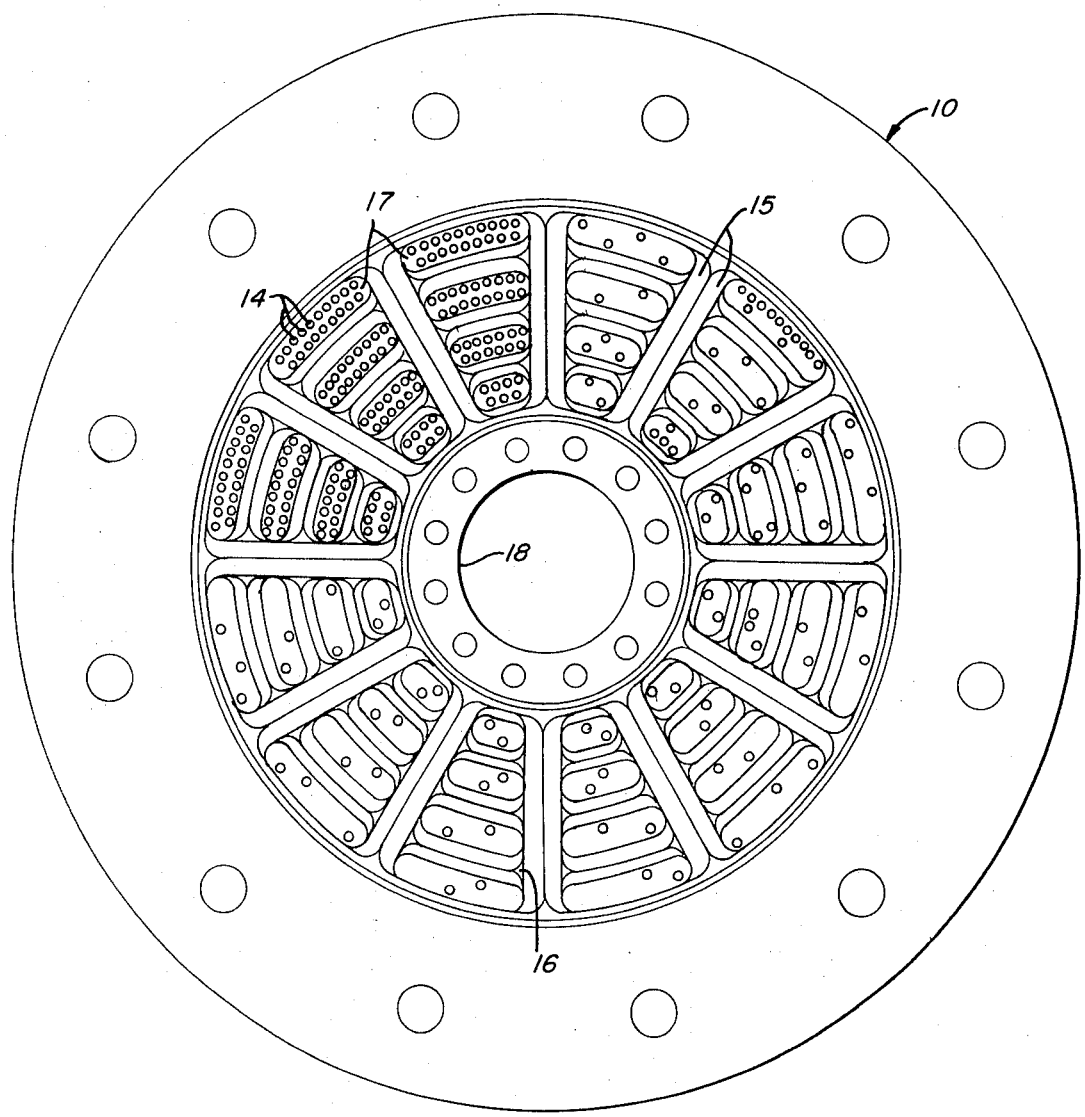
FIG. 1 is a top plan view of a die plate constructed according to the invention.
Figure 2:
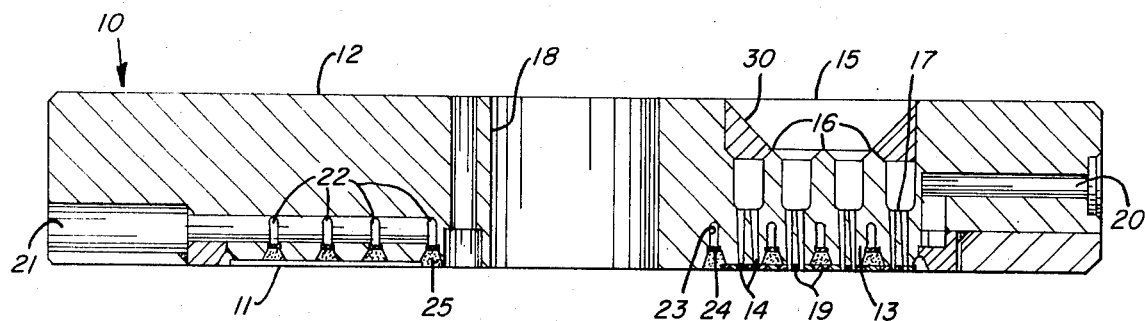
FIG. 2 is a full cross-sectional view of a die plate taken along section II—II of FIG. 3.
Figure 3:
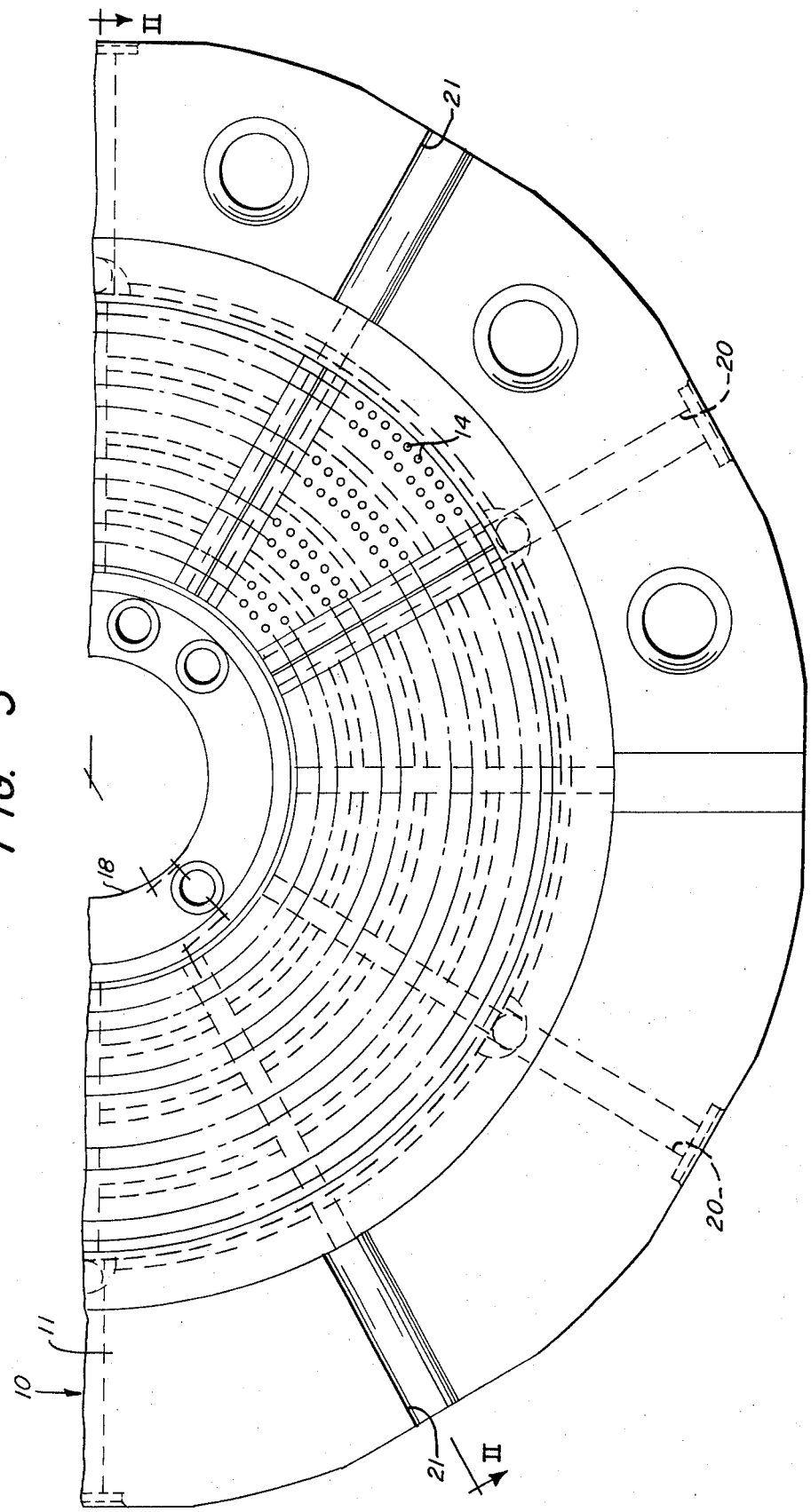
FIG. 3 is the bottom plan view of the die plate shown in FIG. 1.

Referring now to FIGS. 1 through 3 for the preferred embodiment of the invention, die plate (10) is generally a solid block of metal such as steel. It has a downstream face (11) and an upstream face (12); these faces being named in accordance with their position in the extruder during the flow of plastic material. The downstream face of the die plate is also the downstream side of a relatively thin metal web (13). In this web (13) there are orifices (14) through which the plastic flows and exits from the die plate. At the exit of the die plate, cutting means will sever the extruded plastic into pellets, the cutting means are not shown. Radial ribs (15) are disposed from the upstream side (17) of the metal web (13) to the upstream face (12) of the die plate (10). Annular ribs (16) are disposed on the upstream side of the web (13) and terminate at a position intermediate the upstream side of the web (13) and the upstream face (12) of the die plate. There is a central bore (18) in the die plate which is a means for receiving the die face pelletization device. The radial ribs and the annular ribs are formed integrally with the thin metal web (13). Radial ribs (15) are preferably about twice as thick as the annular ribs (16). The combination of radial ribs (15) and intersecting annular ribs (16) integrally connected to the web (13) provides a means by which deflection of the web (13) from the temperature differential between the upstream side of the web (17) and the cooling water and downstream face (11) of the die plate is resisted. The combination of ribs resists deflection both radially outwardly from the center line of the die plate and concentrically about the center line of the die plate. Support for the section of metal web (13) containing the orifices (14) is thus maximized by the integral rib structure. Particularly in the radial direction, as best shown in FIG. 2, the disposition of orifices (14) between the annular ribs (16) minimizes the free unsupported length of web (13) in the radial direction. As shown, the annular ribs (16) are slightly curved to form an arc; however, they may also be straight, i.e., form chords between the radial ribs (15).

The die plate is of sufficient thickness to resist the overall forces from deflection by the differential temperatures maintained about the downstream face of the plate. The annular ribs (16) may extend for distances up to about 2/3 of the depth of the radial ribs (15). The web (13) containing the orifices (14) may be about 1/5 to 1/3 of the thickness of the entire die plate.

The die plate (10) is heated by introducing heat exchange media, such as steam, into a heat exchange inlet (20) which is radially disposed about the plate. This inlet (20) communicates with annularly disposed heat exchange passageways (22). These passageways (22) exit at heat exchange outlets (21). As is shown in FIG. 3, a steam inlet (20) will distribute steam to adjacent heat exchange passageways (22) which intersect with the inlet. The media flows through the passageways and then flows out the heat exchange outlets (21) which are adjacent to each side of the inlet (20). The radial distribution of the heat exchange media such as steam reduces the deleterious effect upon the die plate which comes from the erosive action of steam when the direction of a steam jet is suddenly changed. The heat exchange passageways (22) may have their cross section varied to accommodate the heat load for each passageway; the passageways may be separated from each other by two or more rows of orifices. A preferred construction of the invention is shown where the heat exchange inlet (20) and heat exchange outlet (21) are formed as channels in the radial ribs (15) while the heat exchange passageways (22) are formed as channels in the annular ribs (16).

The heat exchange passages (22) may be formed in the die plate by conventional machining techniques such as milling. When the heat exchange passageways (22) have a portion of their overall cross section formed integral with the web, the remaining portion of the passageway is closed by metallic member (24). This member (24) may be fixed to the remainder of the web (23) by a weld (25). Generally, a facing material (19) is included on the downstream face of the die plate to provide a long-wearing surface against which the cutting knives of the pelletizing operation apparatus will operate.

The radially diposed heat exchange passageways of this invention permit the use of a wide variety of heating media, for example, oil and steam of various temperatures for heating the die plate. The resistance to erosion increases the capability for control of distribution of heat during the operation of the extruder and is a valuable advantage of these heat exchange passageways. The construction of the passageways, by providing for a portion of the passageway to be integral with the die plate and another portion of the die of the passageway to be of a separate metallic element, permits the cross-sectional area of each passageway to be controlled so that distribution of steam through the various passageways can be predetermined. The number and spacing of the arcuate ribs (16) will depend upon the number of orifices across the cross-sectional area of the die plate and the temperature differential inducing deflection in the web of the die plate.

Generally, the orifices in the die plate will be of a diameter from 0.06 to 0.10 inch. As shown in FIG. 2, when two rows of orifices are disposed in each annular segment defined by two annular ribs in which there heat exchange passages, each row of orifices is heated along one side by the adjacent heat exchange passage. In addition, the radial ribs and annular ribs intersect to form compartments, as shown in FIG. 1. The relative area of each compartment and the streaming of the ribs, shown as chamfered leading edges, will cause flowing polymer to distribute itself across the area of the die plate. This distribution will give uniform flow of polymer per unit of cross-section area of die plate so that each of the orifices will have a uniform output of polymer for pelletization by the knives of the cutting device. For maximum cutting efficiency, each row of orifices should be staggered with respect to its adjacent rows, as shown in FIG. 3, so that the cutting knives are cutting across only a few orifices at any given instant.

The combination of radial and annular ribs also allows the use of annular rings or plugs to change the cross sectional area of available die plate throughput by allowing plugs or rings to be inserted across the upstream entrances of selected orifice compartments. A plug-like element (30) is shown in FIG. 2 which is shaped to fit the entrances of the innermost and outermost compartments of orifices. This reduces the available cross section of die plate to the remaining interior orifices. Such plugs can be used to shut off any number of selected compartments.

Having thus described this invention by terms of a specific embodiment, it can be seen that it also includes those variations in die plate construction which would be considered equivalents by one of ordinary skill in the art.

I claim:

1. An improved die plate for the continuous extrusion of molten thermoplastic resin, having a downstream face, an upstream face and connecting means for underwater die face pelletization devices, characterized by the downstream face being the downstream edge of a relatively thin metal web, said web containing a plurality of orifices for extrusion of thermoplastic resin into pellet form, a means integral with said web to resist deflection of said web, said means including:

radial ribs extending from the upstream side of said web to the upstream face of said die plate, and annular ribs extending from the upstream side of said web to a position intermediate of said web and said upstream face of said die plate, said annular ribs intersecting said radial ribs, and said orifices being disposed between said annular ribs.

2. The die plate of claim 1 having a central bore from said upstream face to said downstream face as the connecting means for underwater die face pelletization devices.

3. The die plate of claim 1 wherein said annular ribs are chords.

4. The die plate of claim 1 wherein said annular ribs are arcs.

5. The die plate of claim 1 wherein the leading edges of said ribs are streamlined to facilitate flow of plastic.

6. The die plate of claim 1 wherein said orifices are disposed in concentric circles about the central axis of said die plate and where no more than two rows of said orifices are disposed between adjacent annular ribs.

7. The die plate of claim 1 wherein said radial ribs contain transfer lines for heat exchange media flowing from an external source to said orifices, and where said annular ribs contain heat exchange passageways for heating of said orifices.

8. The die plate of claim 7 wherein a radial rib provides heat exchange media to intersecting heat exchange passageways in said annular ribs.

9. The die plate of claim 1 wherein said annular ribs and said radial ribs are disposed to form compartments for receiving and distributing flowing plastic at a uniform flow rate across the area of the die plate.

10. The die plate of claim 7 wherein said heat exchange passageways have a portion of their cross-section integral with said web and have the remainder of said cross-section closed by a separate metallic member, said separate metallic member being oriented toward the downstream side of said web and being fastened to said web by a layer of weld metal disposed on the downstream side of said metallic member.

11. The die plate of claim 1 in combination with a thermoplastic resin extrusion machine adapted for extrusion of polystyrene wherein said die plate is disposed vertically downward.

* * * * *